US012137341B2

(12) United States Patent
Karia et al.

(10) Patent No.: US 12,137,341 B2
(45) Date of Patent: Nov. 5, 2024

(54) MESSAGE DELIVERY IN CELLULAR ROAMING SCENARIOS

(71) Applicant: INTERNATIONAL BUSINESS MACHINES CORPORATION, Armonk, NY (US)

(72) Inventors: Jignesh K Karia, Thane (IN); Mukundan Sundararajan, Bangalore (IN); Pankaj Satyanarayan Dayama, Bangalore (IN); Shilpa Shetty, Bangalore (IN); Neha Shah, Kolkata (IN); Vishal Awal, Mumbai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 17/463,506

(22) Filed: Aug. 31, 2021

(65) Prior Publication Data
US 2023/0061362 A1    Mar. 2, 2023

(51) Int. Cl.
*H04W 12/06*    (2021.01)
*H04L 9/08*    (2006.01)
(Continued)

(52) U.S. Cl.
CPC ............ *H04W 12/06* (2013.01); *H04L 9/085* (2013.01); *H04L 63/0838* (2013.01);
(Continued)

(58) Field of Classification Search
CPC ......... H04W 12/06; H04W 4/14; H04W 8/06; H04W 12/033; H04L 9/085; H04L 63/0838; H04L 63/0846; H04L 2463/082
See application file for complete search history.

(56) References Cited

U.S. PATENT DOCUMENTS 10,231,116 B2    3/2019  Perumal et al.
2009/0282251 A1*  11/2009  Cook .................. H04L 63/18
                                                                713/171
(Continued)

FOREIGN PATENT DOCUMENTS

CN           110536289 A   * 12/2019
KR         20120112958 A     10/2012
WO      WO2006087720 A1       8/2006

OTHER PUBLICATIONS

Mell, Peter, et al., "The NIST Definition of Cloud Computing", NIST Special Publication 800-145, Sep. 2011, Gaithersburg, MD, 7 pgs.
(Continued)

*Primary Examiner* — Piotr Poltorak
*Assistant Examiner* — Lydia L Noel
(74) *Attorney, Agent, or Firm* — Michael A. Petrocelli, Esq.; Matthew M. Hulihan, Esq.; Heslin Rothenberg Farley & Mesiti P.C.

(57) ABSTRACT

Message delivery in cellular roaming scenarios involves a user device activated with a home telecommunications service provider (TSP) that provides cellular service to the user device. The user device is located in a remote location and the user device is activated with a remote TSP providing roaming cellular service to the user device in a remote location on a cellular network of the remote TSP. A process includes, based on the user initiating a transaction with a remote application server that requires user authentication based on delivery of a transactional text message, receiving from the remote application server the transactional text message, encrypting the transactional text message to produce an encrypted transactional text message, and forwarding the encrypted transactional text message to the remote TSP for delivery as a short message service (SMS) text to the user device in the remote location via the cellular network of the remote TSP.

20 Claims, 12 Drawing Sheets

(51) Int. Cl.
  H04L 9/40 (2022.01)
  H04W 4/14 (2009.01)
  H04W 8/06 (2009.01)
  H04W 12/033 (2021.01)

(52) U.S. Cl.
  CPC .......... H04L 63/0846 (2013.01); H04W 4/14 (2013.01); H04W 8/06 (2013.01); H04W 12/033 (2021.01); *H04L 2463/082* (2013.01)

(56) References Cited

U.S. PATENT DOCUMENTS

| | | | | |
|---|---|---|---|---|
| 2012/0047262 A1* | 2/2012 | Laarakkers | ........... | H04W 12/06 709/225 |
| 2012/0122423 A1* | 5/2012 | Helmreich | ............ | H04W 12/40 455/411 |
| 2013/0067552 A1* | 3/2013 | Hawkes | ................ | H04W 12/08 726/7 |
| 2014/0248871 A1* | 9/2014 | Sell | ......................... | H04W 8/08 455/432.1 |
| 2017/0223621 A1* | 8/2017 | Tan | ....................... | H04W 60/00 |
| 2017/0272930 A1 | 9/2017 | Jiang | | |
| 2020/0236549 A1* | 7/2020 | Liu | ....................... | H04W 12/35 |

OTHER PUBLICATIONS

"Feistel Block Cipher", tutorialspoint.com. Retrieved on Aug. 11, 2021 from the Internet URL: <https://www.tutorialspoint.com/cryptography/feistel_block_cipher.htm>, 2 pgs.

"Get text verification codes direct to your email!", GlobalOTP. Retrieved on Aug. 11, 2021 from the Internet URL: <https://www.globalotp.com/>, 8 pgs.

* cited by examiner

MESSAGE DELIVERY IN CELLULAR ROAMING SCENARIOS

BACKGROUND

Often when a user performs sensitive online transactions that necessitate heightened security or additional authentication measures before completion of the transaction, such as online financial transactions, an application server will send a transactional text message, i.e., as a Short Message Service (SMS) text message, to the cellular telephone of the user to authenticate the user. Transactional text messages can be of varying types. A common type if a one-time password (OTP) that the user receives and is to provide to a web application to authenticate the user. Another type of transactional text message is a unique hyperlink, for instance one enabling the user to change the account user's password or to click to approve an initiated transaction.

SUMMARY

Shortcomings of the prior art are overcome, and additional advantages are provided through the provision of a computer-implemented method. A user initiates a transaction with a remote application server. The transaction requires user authentication based on delivery of a transactional text message to a user mobile device via a cellular network connection. Based on the user-initiated transaction, the method receives from the remote application server the transactional text message for provision to the user device. The user device is activated with a home telecommunications service provider (TSP) that provides cellular service to the user device in a home location on a cellular network of the home TSP with a home cellular number provided by the home TSP. The transactional text message is received by the home TSP and is to be sent by the home TSP to the user device. The user device is located in a remote location and is activated with a remote TSP providing roaming cellular service to the user device in the remote location on a cellular network of the remote TSP. The method encrypts the transactional text message to produce an encrypted transactional text message. Further, the method forwards the encrypted transactional text message by the home TSP to the remote TSP for delivery as a short message service (SMS) text to the user device in the remote location via the cellular network of the remote TSP.

Further, a computer system is provided that includes a memory and a processor in communication with the memory, wherein the computer system is configured to perform a method. A user initiates a transaction with a remote application server. The transaction requires user authentication based on delivery of a transactional text message to a user mobile device via a cellular network connection. Based on the user-initiated transaction, the method receives from the remote application server the transactional text message for provision to the user device. The user device is activated with a home telecommunications service provider (TSP) that provides cellular service to the user device in a home location on a cellular network of the home TSP with a home cellular number provided by the home TSP. The transactional text message is received by the home TSP and is to be sent by the home TSP to the user device. The user device is located in a remote location and is activated with a remote TSP providing roaming cellular service to the user device in the remote location on a cellular network of the remote TSP. The method encrypts the transactional text message to produce an encrypted transactional text message. Further, the method forwards the encrypted transactional text message by the home TSP to the remote TSP for delivery as a short message service (SMS) text to the user device in the remote location via the cellular network of the remote TSP.

Yet further, a computer program product including a computer readable storage medium readable by a processing circuit and storing instructions for execution by the processing circuit is provided for performing a method. A user initiates a transaction with a remote application server. The transaction requires user authentication based on delivery of a transactional text message to a user mobile device via a cellular network connection. Based on the user-initiated transaction, the method receives from the remote application server the transactional text message for provision to the user device. The user device is activated with a home telecommunications service provider (TSP) that provides cellular service to the user device in a home location on a cellular network of the home TSP with a home cellular number provided by the home TSP. The transactional text message is received by the home TSP and is to be sent by the home TSP to the user device. The user device is located in a remote location and is activated with a remote TSP providing roaming cellular service to the user device in the remote location on a cellular network of the remote TSP. The method encrypts the transactional text message to produce an encrypted transactional text message. Further, the method forwards the encrypted transactional text message by the home TSP to the remote TSP for delivery as a short message service (SMS) text to the user device in the remote location via the cellular network of the remote TSP.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
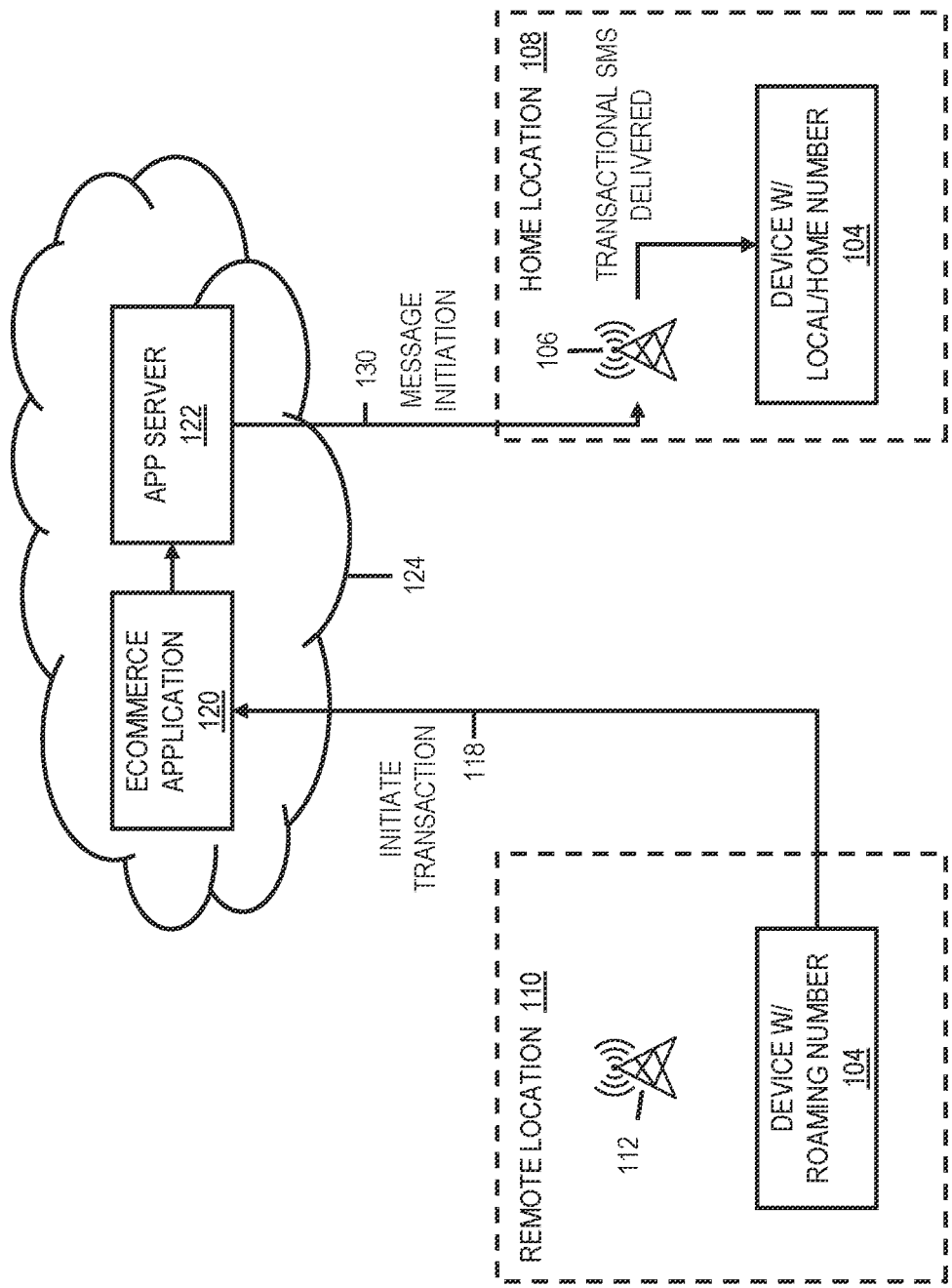
FIG. 1 depicts an example of message non-delivery in a cellular roaming scenario.

Aspects described herein relate to provision of text messages to user cellular devices. Example text messages are transactional text messages in connection with user-initiated transactions involving web applications. The terms "user" and "subscriber" may be used interchangeably herein to refer to a subscriber of cellular service provided by cellular telecommunications service provider (TSP). A user/subscriber makes use of the cellular service via a cellular device, referred to herein as a "user device" or "subscriber device". The terms "subscriber", "user", "subscriber device", and "user device" may be used interchangeably herein, for instance when referring to actions by a subscriber or by the device on behalf of that subscriber.

User cellular devices are activated with a cellular TSP. Typically, a given user will activate the device on a primary TSP, for instance one offering cellular service to the user in the user's home location (country, territory, region, etc.). This TSP is referred to herein as the user's home TSP, providing cellular service to the subscriber device in a home location on a cellular network of the home TSP. As part of this, the home TSP assigns the user/device a telephone number ("home cellular number") for user communication via telephone or text messages. Sometimes users travel to a location ("remote location") outside of a coverage area of the home TSP's cellular infrastructure. The user/device is said to be "roaming" in this case, in which case the user device can be registered/activated with a remote TSP that provides (roaming) cellular service to the user device in the remote location on a cellular network of the remote TSP.

One roaming scenario, referred to herein as subscribed roaming, sees the user subscribe, even if temporarily, with the remote TSP as a user of the remote TSP cellular service. In this case, the remote TSP assigns the user device a telephone number ("roaming cellular number") that is local to the remote location and for use on the roaming TSP cellular service. Another roaming scenario, referred to herein as international roaming, enables the user's home cellular number to work in the remote location on the remote TSP's cellular network. The home TSP offers an international roaming service to the subscriber such that the home cellular number is extended to the international level, i.e., to the remote TSP's cellular network so that the home cellular number is usable on the remote TSP's cellular network. Often the home TSP and remote TSP have prearranged terms for offering international roaming service to their customers.

Problems of receiving messages can arise in situations when the user/subscriber is roaming. In the subscribed roaming scenario in which the user uses a roaming cellular number, the home TSP must be made aware of the roaming cellular number. Otherwise, text messages sent to the user's home cellular number will not arrive to the user's device in the remote location via the roaming cellular number. This is problematic for numerous reasons. In text message applications of time-sensitivity, for instance when a message such as an OTP for authentication is sent to the user in connection with a financial transaction, the message will be sent to the user's home cellular number but will not arrive at the user device using the roaming number. In this case, the user cannot authenticate via the OTP and will be unable to complete the transaction.

FIG. 1 illustrates this problem scenario. A user device 104 is activated with a home (TSP) 106 that offers cellular coverage in a home location 108 that provides cellular service to the user device in the home location 108 on the cellular network of the home TSP 106. As part of this, a home cellular number is provided by the home TSP to the user device 104. At some point the user travels to remote location 110 in which remote TSP 112 provides a cellular network. The user device 104 at the remote location 110 can be activated with the remote TSP 112, which provides roaming cellular service to the user device 104 in the remote location on the cellular network of the remote TSP 112.

When the user is in the remote location, the user initiates (118) a transaction with a remote application server 122 via an e-commerce (in this example) application 120. The application 120 and backend application server 122 are hosted in a cloud environment 124 in this example, though the application 120 with which the user interacts to engage with the application server 122 could be partially or wholly installed on the user device 104 in other examples, for instance if the user uses a web browser or locally installed mobile application on the user device 104 to communicate with a cloud server to initiate the transaction. The cloud environment 124 could be located in remote location 110, home location 108, or another location.

In this scenario, the subscriber does not carry its local (home) cellular number but subscribes to a roaming cellular number (i.e., local to the remote location). Based on initiation 118 of the transaction with the ecommerce application 120, the application server 122 interacts 130 with the home TSP to initiate (130) sending of an SMS message with an OTP to the user's home cellular/mobile number registered with the ecommerce application 120. The transactional SMS message is delivered to the user's home cellular number but does not reach the user device at that time because it is on the roaming cellular service at the remote location. This leads to unavailability of the message sent by the application server 122 to the subscriber via the home TSP while the user is in the remote location.

Figure 2A:
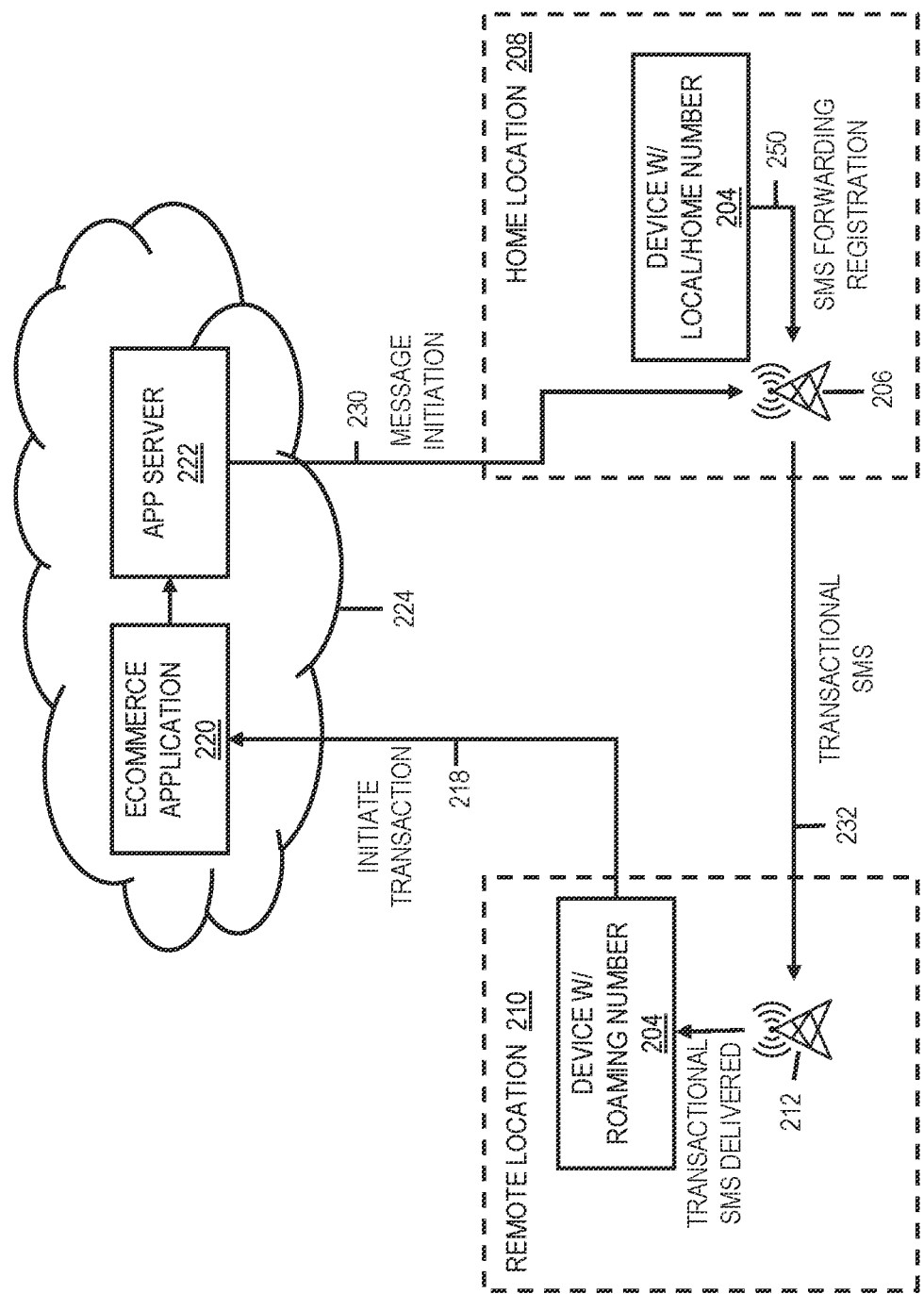
FIGS. 2A-2B depict examples of message delivery in cellular roaming scenarios based on registration of a roaming number with a home telecommunications service provider.
Figure 2B:
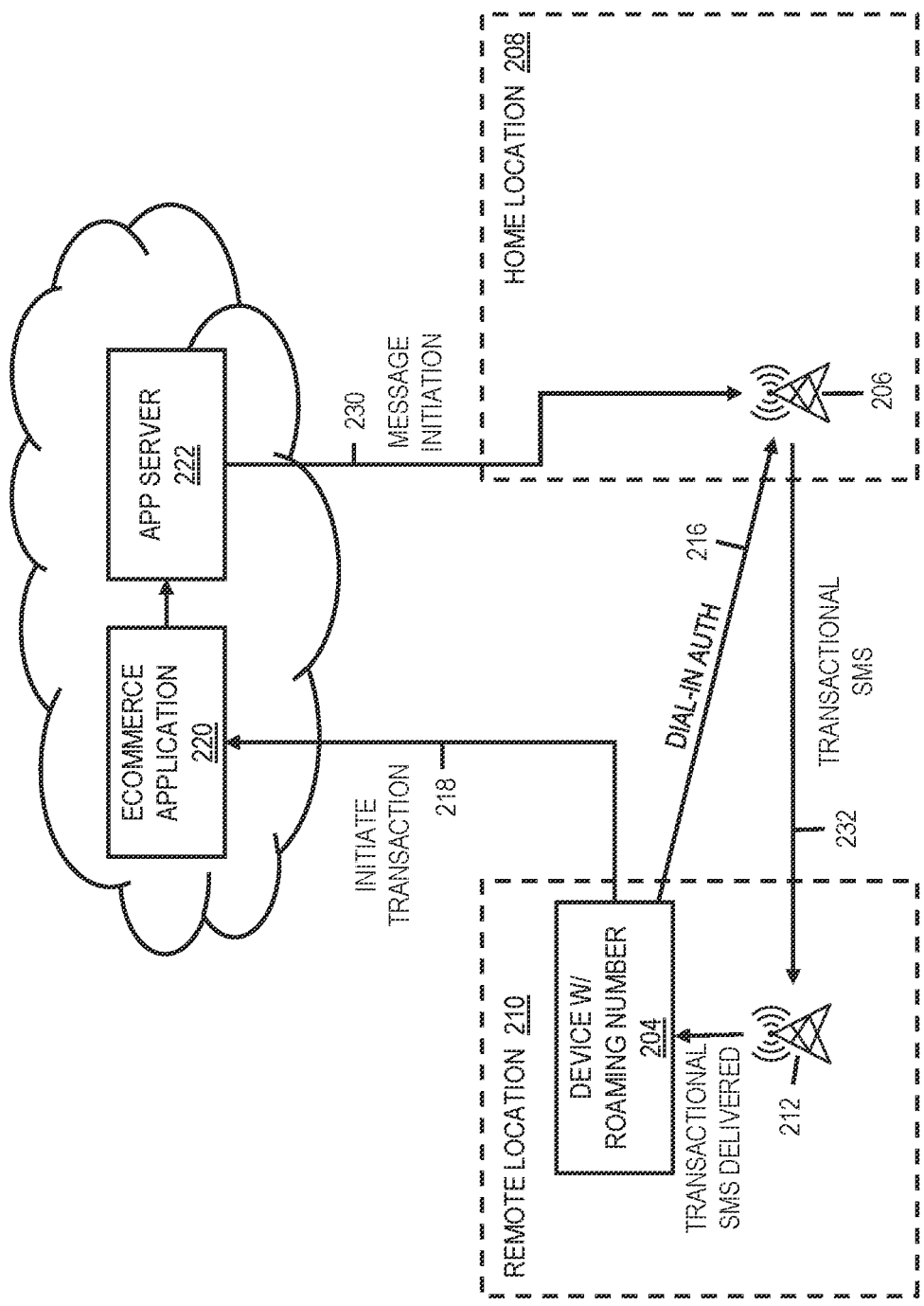

In these situations, it may be possible to register the roaming cellular number with the home TSP so that messages are forwarded by the home TSP to the remote TSP for delivery to the user device via the roaming cellular number assigned by the remote TSP. FIGS. 2A and 2B illustrate examples of this.

FIG. 2A again includes home location 208, home TSP 206, user device 204 that uses the home cellular number in the home location 208, remote location 210, remote TSP 212, and cloud environment 224 with ecommerce application 220 and application server 222. At some point prior to traveling to the remote location 210, the user sets-up an SMS forwarding registration 250 with the home TSP 206. This directs the home TSP 206 to forward to the roaming cellular number messages/calls initially directed to the home cellular number. The user, with device 204 at the remote location 210 where it obtains and uses a roaming cellular number in the remote location 210, initiates 218 a transaction with the ecommerce application 220, which communicates with the application server 222 to initiate 230 with the home TSP 206 sending of an SMS message with an OTP to the user's home cellular/mobile number registered with the ecommerce application 220. The home TSP 206 will deliver the message 232 to the roaming cellular number on account of the SMS forwarding registration previously setup by the user.

Setting up the SMS forwarding registration in advance as in FIG. 2A is one example of registering the roaming cellular number with the home TSP as an active secondary number to establish a link between the home cellular number and the roaming cellular number. As an alternative, sometimes the user sets-up the registration to establish the roaming number as an active secondary number after traveling to the remote location. FIG. 2B depicts an example in which the user accomplishes this by a dial-in authentication. In FIG. 2B, the user in remote location 210 uses device 204 in the remote location 210 while on the remote TSP 212 cellular network to dial (216) into the home TSP 206 of the home location 208 and authenticate the user/device with the home TSP. The user can explicitly specify the roaming number, and/or the home TSP 206 recognizes the roaming number by way of the dial-in to establish a link between the home cellular number provided by the home TSP and the roaming cellular number provided by the remote TSP 212. The user, with device 204 at the remote location 210, initiates 218 a transaction with the ecommerce application 220, which communicates with the application server 222 to initiate 230 with the home TSP 206 sending of an SMS message with an OTP to the user's home cellular/mobile number registered with the ecommerce application 220. The home TSP 206 will deliver the message 232 to the roaming cellular number on account of the dial-in authentication and registration of the roaming number previously with the home TSP 206.

Both of the scenarios of FIG. 2A and FIG. 2B are examples of registering the roaming cellular number with the home TSP as an active secondary number to establish a link between the home cellular number and the roaming cellular number, and both are based on the user authenticating with the home TSP to securely register the roaming cellular number with the home TSP.

Figure 3:
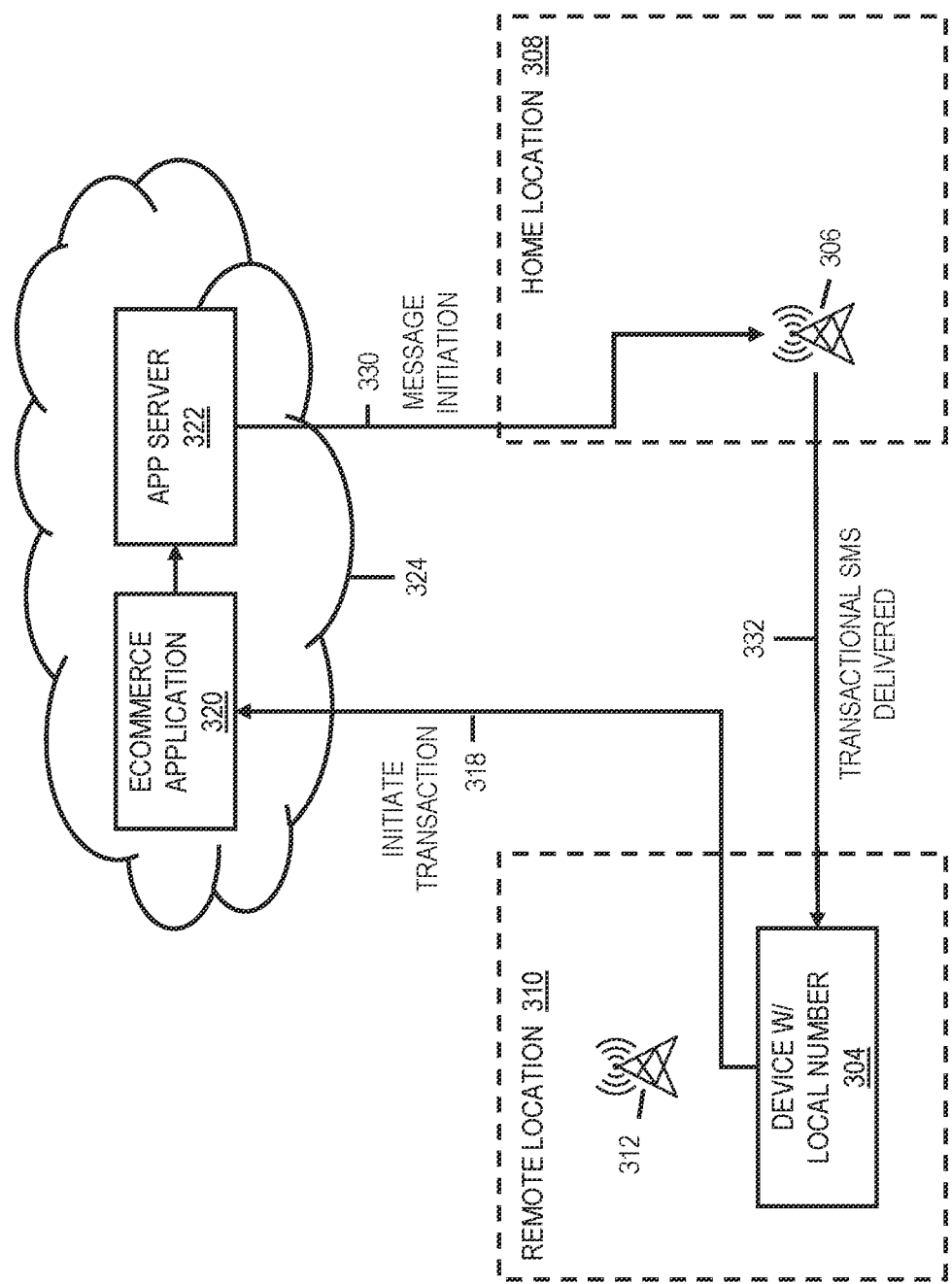
FIG. 3 depicts an example of message delivery in an international roaming scenario.

In an international roaming scenario, a message sent to the home number will be provided to the remote TSP which is aware of the user device on the remote TSP's cellular network. FIG. 3 illustrates this situation. When travelling to remote location 310, the subscriber/user device 304 carries its home cellular number provided by home TSP 306 of the home location 308 and makes use of an international roaming agreement between the home TSP 306 and the remote TSP 312 of the remote location. The user, with device 304 at the remote location 310, initiates 318 a transaction with the ecommerce application 320, which communicates with the application server 322 to initiate 330 with the home TSP 306 sending of an SMS message with an OTP to the user's home cellular/mobile number registered with the ecommerce application 320. The home TSP 306 will deliver the message 332 to the home cellular number in use on the remote TSP 312 cellular network in the remote location 310. Thus, a transactional message is made available to the subscriber in remote location.

Although some situations of subscribed roaming (FIG. 2A, 2B) and international roaming (FIG. 3) will deliver message to the roaming user, there are potentially adverse consequences. One relates to security: transfer of the message by the home TSP into the remote TSP's network can be considered a security risk because the message content, which is potentially sensitive information, would be available to the remote TSP and subject to potential compromise while in-flight. Another problem relates to timing: latency/lag time in the delivery of an SMS message from a home TSP to roaming devices on other TSP networks can be quite high, perhaps so high that an expiry period of the message content has lapsed by the time the message is finally delivered to the user device in the remote location. At that point the OTP (as an example) is expired and can no longer be used to authenticate the transaction.

Described herein are approaches for message delivery in cellular roaming scenarios. Such approaches can be particularly useful in situations of transactional message delivery, for instance delivery of time and security-sensitive messages for transaction authentication or other purposes to cellular users while roaming in remote locations (out of the subscriber's home cellular network), in order to facilitate transaction completion. Accordingly, methods are provided for securely delivering transactional (including private, confidential) communications to a registered number of a roaming subscriber via home/roaming cellular numbers while the subscriber is in a roaming location. Methods are provided for securely registering a roaming number provided by a remote TSP of a roaming location as an active secondary number for the user with a home TSP, and activating a seamless communications path for secure transactional message communication between the home TSP and the subscriber device. This pathway can be pre-established, activated, and tested for transactional communication in roaming situations before transaction initiation. For security, a process can apply encryption to messages received while the subscriber is roaming for delivery to the subscriber device via the remote TSP, requiring the user to separately authenticate/provide shared secret(s) to properly decrypt the message. Shared secret(s) can facilitate extraction of multilevel encryption/decryption security keys to obtain sensitive message data (such as OTPs) related to initiated financial or other types of transactions. Expiry timeline(s) or other parameters can be established for either or both of the registration of the roaming cellular number with the home TSP and the shared secret(s) in order to enhance security.

Figure 4:
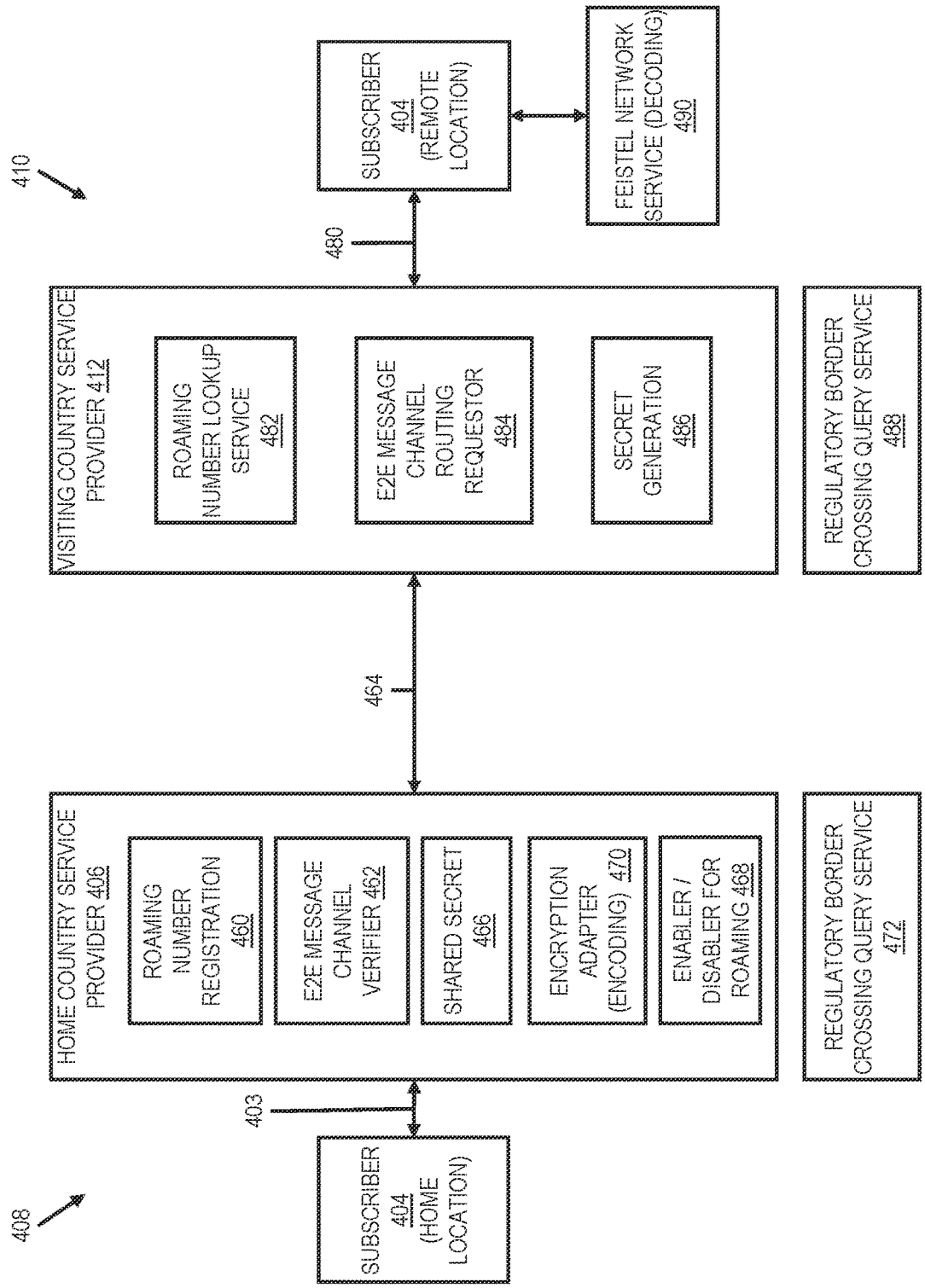
FIG. 4 depicts an example conceptual diagram of a system for message delivery in cellular roaming scenarios in accordance with aspects described herein.

FIG. 4 depicts an example conceptual diagram of a system for message delivery in cellular roaming scenarios, in accordance with aspects described herein. The system is implemented by a collection of computer, telecommunications, and network system equipment, for instance user consumer electronic equipment (e.g., a cellular telephone/smartphone), telecommunications equipment of TSPs, and computer/network equipment providing wired/wireless network(s) for telecommunication and data communication between various devices.

Home location 408 includes a home TSP 406 that provides cellular service (including, for example telephonic/voice communications and broadband data/internet/messaging services) to subscribers/user devices. One such subscriber of home TSP cellular service is represented by user device 404. In this example, home location 408 is a home country of the subscriber.

The home TSP 406 provides a collection of web services available to the subscriber 404 over an HTTPS connection 403. Roaming number registration component 460 is for registration of a roaming cellular number with the home TSP 406. The registration can be done manually by the subscriber via dial=in authentication or a provided interface for the user to specify a forwarding number to which calls/messages are to be forwarded, as examples. Home TSP 406 also provides an end-to-end message channel verifier 462 for activating/verifying/testing a communications channel 464 between the home TSP 406 and a remote TSP 412 for communications therebetween pursuant to a message routing agreement between the two TSPs. Channel 464 enables provision of calls/messages from the home TSP to the subscriber device 404 in the remote location 410 and while connected to remote TSP 412. The remote location 410 is a different (remote) country in this example. The verifier 462 can be automatically or manually triggered to send a message to the remote TSP 412. One useful application is to establish the communications channel 464 between the home TSP and the remote TSP, and ultimately to the user device 404 when located in the remote location 410. With a channel being established, it is expected that subsequent messages sent by home TSP 406 to remote TSP 412 for provision to the user device 404 will arrive faster because the channel has been established.

The home TSP 406 also provides a shared secret component 466 for managing shared secret(s), such as security personal identification numbers (PINs), between the home TSP 406 and the subscriber 404. In accordance with some embodiments, the home TSP 406 generates and shares with the subscriber a shared secret (e.g., a 4-digit PIN) that is used by the home TSP 406 to generate encryption key(s) to encrypt message(s) it is to send to the remote TSP 412 for provision to the subscriber 404 when in the remote location 410. That same shared secret can be used by the user device 404 to generate decryption key(s) to decrypt a received encrypted message from the home TSP 406 that was received via the remote TSP 412. Encryption adapter 470 can perform this encryption using any desired technique(s) to encrypt messages to be forwarded by the home TSP 406 to the remote TSP 412 for delivery to the subscriber device 404 in the remote location 410. As a specific example, encryption adapter 470 applies Feistel encryption, in which shared secret(s) are used to generate subkeys and those subkeys are used in 'rounds' to produce an encrypted message.

Enabler/disabler component 468 enables and disables roaming services for the subscriber based on any desired triggers or other parameters. Roaming service could be time-based, location-based, or based on other factors that would automatically enable or disable roaming service and provision of messages while the subscriber is in a cellular roaming scenario. As a specific example, regulatory border crossing query service 472 is leveraged to query the location of the user device 404 to determine whether the user device is in a remote location outside of the home TSP cellular network and/or a geographic boundary (such as a territory, state, country, etc.) in which the home TSP sits. Roaming service could be enabled/disabled based on the location of the user device. For instance, roaming might be automatically disabled based on detecting that the user device, previously located in the remote location 410, has left a geographic boundary of that remote location 410 (such as a country border) in which the roaming service was being provided to the user device 404.

Additionally, or alternatively, the enabler/disabler 468 could be manually engaged (e.g., by the subscriber logging into a home TSP 406 system) to enable/disable roaming service for the subscriber.

While at the remote location 410, subscriber device 404 can interact with remote TSP 412 over an HTTPS connection 480. Remote TSP 412 provides a roaming number lookup service 482 providing any desired roaming number services. One example is to verify subscriber device 404 when connected to the remote TSP and/or to perform a lookup of the subscriber's home cellular number with the home TSP. Additionally, service 482 could enable home TSP 406 to lookup the roaming number assigned to the subscriber device by the remote TSP, for instance to register that roaming number with the home TSP.

End-to-end message channel routing requestor 484 is a counterpart component to the verifier 462 at the home TSP, enabling activation/verification/testing of communications flowing between the home TSP and the subscriber device via the remote TSP across channels 464, 480. In a specific example, the user can initiate a test between the remote location and the home location. One such test can see the home TSP provide an encrypted message (encrypted using a secret shared between home TSP and the user) to the remote TSP for provision to the user device 404 in the remote location, after which the user device decrypts the received message, and the user verifies that it was properly decrypted to the plaintext message send by the home TSP. This is to test the communications channel between the home TSP and the subscriber device via the remote TSP as well as the shared secret.

Regulatory border crossing query service 488 can be leveraged by the remote TSP to query the location of the user device 404 to determine whether the user device is in the remote location 410 and/or a geographic boundary (such as a territory, state, country, etc.) in which the remote TSP 412 sits.

Secret generation component 486 can be used in situations when the remote TSP is involved in encryption and/or decryption of messages flowing between the home TSP and the subscriber device. In one example, a first shared secret exists as between the subscriber and the home TSP. Component 486 generates a second shared secret and provides it to the subscriber device 404 and the home TSP 406 (or the user generates the second shared secret and shares it with the remote TSP and home TSP). The home TSP when it is to send a message to the user device in the remote location performs layered encryption by encrypting the message (such as one with a OTP) based on the first shared secret, for instance by using the first shared secret to generate subkeys to encrypt the message and produce an intermediate encrypted message, then encrypting the intermediate encrypted message based on the second shared secret, for instance by using the second shared secret to generate subkeys to encrypt the intermediate encrypted message, to produce a final encrypted message. The home TSP sends this final encrypted message to the remote TSP 412, which leverages a decryption mechanism to perform a level of decryption of that message, for instance using subkeys generated from the second shared secret of which it is aware. This produces the intermediate encrypted message that is unreadable in terms of its content by the remote TSP and intervening entities because the home TSP encrypted the message based on the first shared secret, which is not known by the remote TSP or those intervening entities. The intermediate encrypted message is sent to the subscriber device 404 for decryption using the first shared secret to produce the initial (e.g., plaintext) message.

In a modified example of the above, the home TSP does not perform layered encryption but just encrypts the initial message based on the first shared secret. The second shared secret need not be shared to the home TSP in this case. When the remote TSP receives the encrypted message from the home TSP, the remote TSP encrypts the encrypted message based on the second shared secret and sends the doubly-encrypted message to the subscriber device, which can decrypt the received encrypted message based on the first and second shared secrets (in reverse order in which the message was doubly encrypted) to decrypt the message to its initial plaintext form.

In yet another embodiment, the shared secrets are shared only as between the home TSP and the subscriber. In this case, the remote TSP is not made aware of any shared secret, and instead passes an encrypted message as-is (encrypted by layered encryption performed by the home TSP) to the subscribed device. The subscriber device performs layered decryption based on the shared secret(s) it shares with the home TSP, again in reverse order, to decrypt the received message sent via the remote TSP to the initial plaintext form.

A message decoding service 490 is provided for the user device 404 to facilitate decrypting received messages. The service could be provided as part of a mobile application installed on the device 404 or as a remote web-based service offered by another component via a secure connection to the user device 404. In an example using Feistel ciphers, the service 490 could accept a shared secret and generate encryption or decryption subkeys. The service 490 could provide the subkeys to the user device for decryption of a received encrypted message, or could perform the decryption using the subkeys and provide the decrypted message to the user device/application thereof, for instance a messaging application that displays for the user the plaintext message from the home TSP.

FIGS. 5A-5D depict example processes for message delivery in cellular roaming scenarios, in accordance with aspects described herein. In some examples, aspects of the processes are performed by one or more computer systems, such as those described herein, which may be, or be incorporated into, user/subscriber cellular devices, one or more devices of a telecommunications service provider network, one or more cloud servers, and/or one or more other computer systems.

Figure 5A:
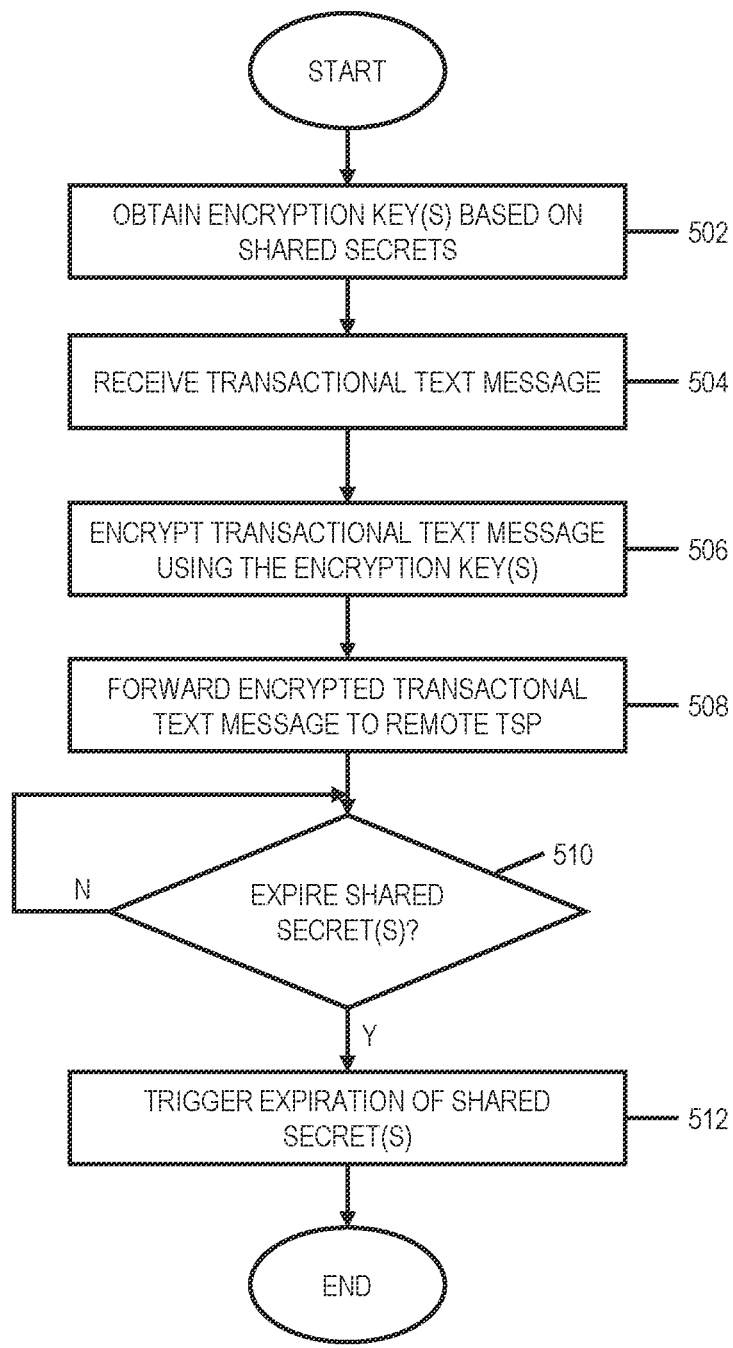
FIGS. 5A-5D depict example processes for message delivery in cellular roaming scenarios, in accordance with aspects described herein.

FIG. 5A depicts an example process performed by a system of a home TSP, in accordance with aspects described herein. The process may be invoked based on a user initiating a transaction with a remote application server. The transaction might require user authentication of the user based on delivery of a transactional text message, for instance a SMS text message with a multi-factor authentication code (such as an OTP or other authentication code), to a user mobile/cellular device via a cellular network connection. An example such transaction is a transaction to use a credit/debit card of an issuing bank, in which the bank requires an SMS-based multi-factor authentication by the user in order to allow the transaction to complete.

In examples, the user device is activated with a home TSP that provides cellular service to the user device in a home location on a cellular network of the home TSP, with a home cellular number being provided to the subscriber/user by the home TSP. The remote application server generates the authentication code, usually as an n-digit OTP, as a time-sensitive one-time-password for the user to provide to the remote application server for multi-factor authentication of the user for performance of the transaction. Additionally, at some point the home TSP performs a setup of shared secret(s) shared between the home TSP and the user. In an example, the home TSP randomly generates an n-digit secret PIN and provides this to the user or software of the user device. The process obtains (502) one or more encryption keys based on those shared secret(s). The shared secret(s) might comprise one or more encryption key(s) themselves. Alternatively, the home TSP uses the shared secret(s) to obtain/generate subkeys, as the encryption keys, to be used for message encryption.

Based on the user initiating the transaction, the process of the home TSP continues by receiving (504) from the remote application server the transactional text message for provision to the user device. The transactional text message is received by the home TSP and is to be sent by the home TSP to the user device. The user device is located in a remote location and is activated with a remote TSP providing roaming cellular service to the user device in the remote location on a cellular network of the remote TSP.

The process proceeds with the home TSP encrypting (506) the transactional text message to produce an encrypted transactional text message. The encrypting uses at least one encryption key to encrypt the transactional text message. In examples, the home TSP encrypts the message using a Feistel cipher methodology for the encryption. For instance, the home TSP possesses one or more shared secrets with the user. For each such shared secret, the home TSP (i) generates m subkeys for different rounds of Feistel network encryption and (ii) encrypts the message using the Feistel method with m-rounds of encryption, one for each of the m subkeys generated from the shared secret. This can be done for each shared secret possessed. On the first iteration, the message as received from the remote application server is encrypted. On each subsequent iteration, the message that was produced from the prior iteration of the Feistel encryption is encrypted in the next iteration. In this manner, the encryption applied to the initial message is layered.

Though a Feistel methodology is employed in examples discussed herein, the messages could be encrypted using any desired encryption scheme.

Once the message is encrypted, the process forwards (508) the encrypted transactional text message to the remote TSP for delivery as a short message service (SMS) text to the user device in the remote location via the cellular network of the remote TSP.

Additionally, the validity of shared secret(s) could expire upon any desired triggering conditions. For instance, expiration could be triggered by (i) a time-based trigger that expires the shared secret(s) based on passage of a defined amount of time, for instance the duration of the user's visit to the remote location or any other duration specified by the user or another entity, (ii) a location-based trigger that expires the shared secret(s) based on the user device moving out of a geographic boundary of the remote location (for instance the user leaves a foreign country in which the roaming service was provided), and/or (iii) a push-based trigger that expires the shared secret(s) based on receipt of an expiration indication from a trusted source. One example of the push-based trigger is an airline that pushes a notification to the home TSPs of each of the aircraft passengers heading out of the remote location/remote TSP service area.

To this end, the process of FIG. 5A continues by determining (510) whether to expire the shared secret(s) held between the home TSP and the user. For instance, the inquiry inquires whether an expiration trigger, such as described above, has been received/raised. If so (510, Y), the process triggers (512) expiration of the shared secret(s) and ends. Based on the expiration, the home TSP disables, at least temporarily, use of the shared secret(s) in further encryption activity, for instance encrypting subsequent messages to be forwarded to the user device. Otherwise (510, N), the process idles temporary or loops back to 510 to repeat the inquiry. This loop could be interrupted by receipt of another message from the remote application server or any other source to send to the user device at the remote location, in which case the process could return to 504 and repeat with message encryption (506) and forwarding (508).

Figure 5B:
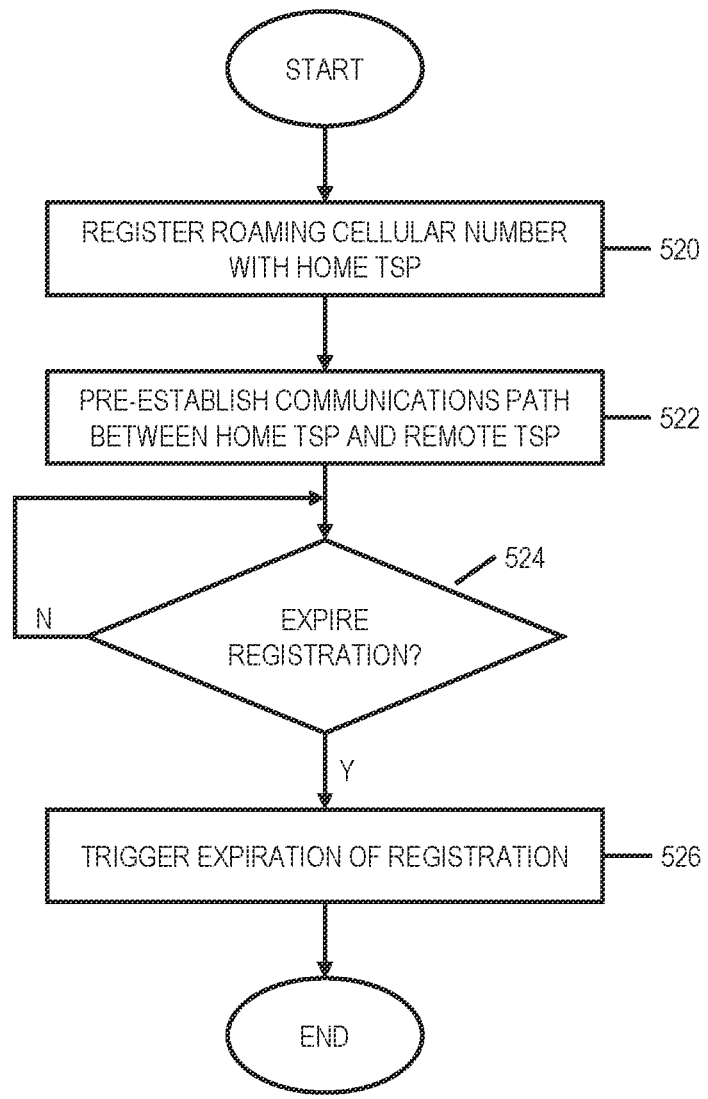

FIG. 5B depicts an example process of additional aspects performed by a home TSP system in a subscribed roaming scenario, where the user device is assigned a roaming cellular number by the remote TSP. In this situation, the encrypted transactional text message is forwarded by the home TSP to the remote TSP for delivery to the user device via the roaming cellular number assigned by the remote TSP. The process in this situation includes registering (520) the roaming cellular number with the home TSP. In examples, the roaming cellular number is registered as an active secondary number to establish a link between the home cellular number and the roaming cellular number. The registering can be based on the user authenticating with the home TSP and securely registering the roaming cellular number therewith. The forwarding (FIG. 5A, 508) includes in this example sending the encrypted transactional text message to the roaming cellular number.

In connection with registration of a roaming cellular number, the process also pre-establishes (522), prior to initiation of the transaction that triggers the process of FIG. 5A, a communications path for transactional message communication between the home TSP and the remote TSP, in which the home TSP sends a test message to the remote TSP for delivery to the user device via the roaming cellular number.

Similar to expiration of shared secret(s) at the home TSP, so too can the roaming cellular number registration be expired at the home TSP. Expiration could be triggered by time-based, location-based, and/or push-based trigger(s) as above. The process determines (524) whether to expire the registration, and if so (524, Y) triggers (526) expiration of the registration of the roaming cellular number (e.g., as the active secondary number with the home TSP) such that the roaming cellular number is disabled from use in forwarding messages to the user device, and ends. If the registration expires, then the home TSP would no longer send messages to the roaming number. If instead it is determined not to expire the registration (524, N), the process loops back to 524 to periodically/aperiodically check whether to expire the registration.

Additionally in subscribed roaming situations, there may be layered encryption applied at the home TSP using multiple shared secrets. Thus, the home TSP can generate a first shared secret, provide it to the user, and receive from the user a second shared secret to be used for double-encryption. The home TSP could use the first shared secret to obtain a first one or more encryption keys (e.g. first subkeys) and use the second shared secret to obtain a second one or more encryption keys (e.g. second subkeys), and perform the encryption (FIG. 5A, 506) using those first one or more and second one or more encryption keys. Layered encryption may be desired by users as additional security measures when traveling to roaming location(s). In some examples, three or more shared secrets are used, and the layered encryption includes three or more layers of encryption based on a corresponding three of more sets of encryption key(s). This may be useful if it expected that the message will travel through several TSPs or other services for which a separate layer of encryption is desired.

As an enhancement when the user travels between roaming locations, the home TSP could perform two layers of encryption on a received message using two shared secrets—one for the home TSP and one for the remote TSP that provides roaming service to the user device when the message is received. As the user moves out of one remote location from a first remote TSP into another remote location on a second remote TSP, the home TSP can expire the shared secret corresponding to the first remote TSP and activate for use the shared secret corresponding to the second remote TSP.

Figure 5C:
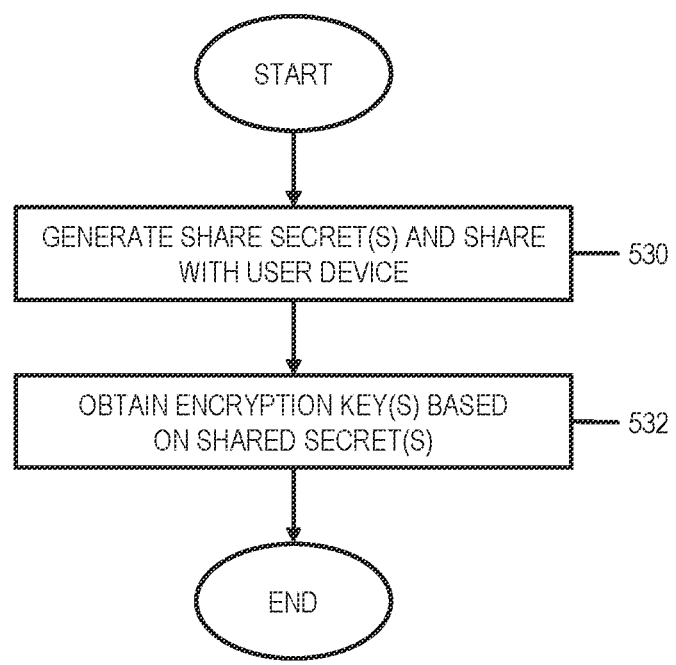

FIG. 5C depicts an example process with additional aspects performed by a home TSP system in an international roaming scenario in accordance with aspects described herein, where the user's home cellular number is registered with the remote TSP for international roaming in which the remote TSP uses the home cellular number in communicating messages to the user device in the remote location. In this situation, the process includes the home TSP generating (530) shared secret(s) and providing the shared secret(s) to the user, and using (532) the shared secret(s) to obtain at least one encryption key, for instance to generate subkeys for Feistel encryption. Encrypting the transactional text message (FIG. 5A, 506) uses the at least one encryption key to encrypt the transactional text message. In addition, in both FIGS. 5B and 5C, the shared secret(s) can be expired (e.g., as discussed above with respect to FIG. 5A, 510, 512).

Figure 5D:
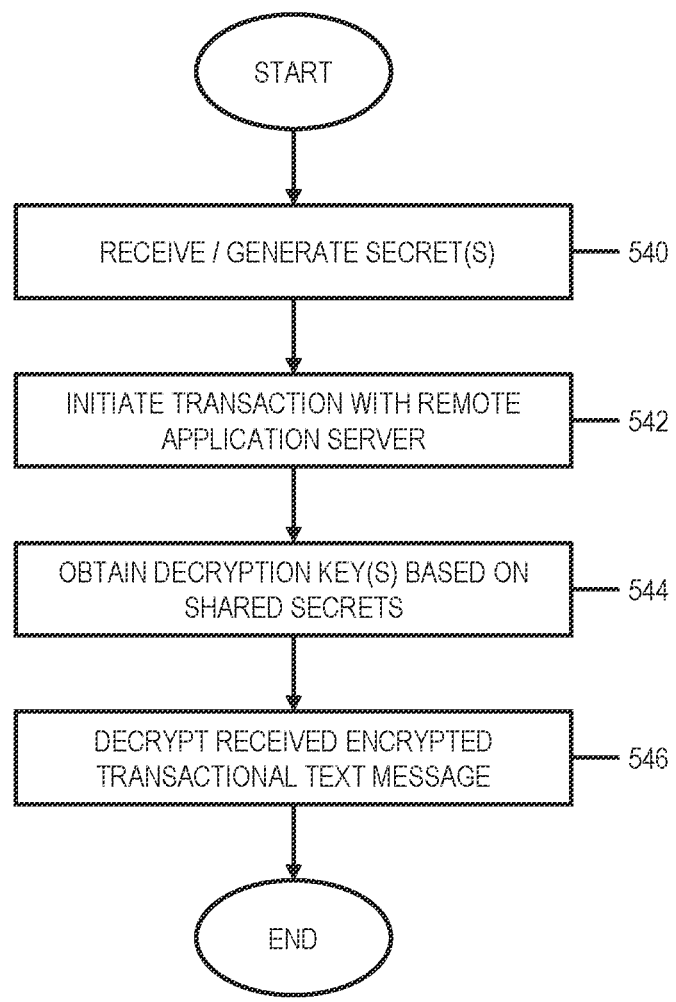

FIG. 5D depicts an example process performed by a subscriber device, in accordance with aspects described herein. The process includes receiving/generating (540) shared secret(s). As an example, the device receives shared secret(s) from home and/or remote TSP(s), and/or the device generates and shares one or more shared secret(s) with home and/or remote TSP(s). In a subscribed roaming situation, then whenever the user device roams to a remote location and registers with a remote TSP to receive a roaming cellular number, the device can generate a new shared secret and share it to the home TSP, e.g., using a dial-in authentication if the number is issued.

The process continues with the user deice initiating (542) the transaction with the remote application server, which triggers the processing of FIG. 5A. At some point before or after transaction initiation the device obtains (544) decryption key(s) based on the shared secret(s) being used. For instance, the user device generates subkeys based on one or more shared secrets and the subkeys are decryption keys to use in decrypting a received encrypted message. Eventually the user device receives and decrypts (546) an encrypted transactional text message using the decryption key(s). The cipher message can be decrypted by the decryption keys only if the shared secret(s) provided by the user as part of obtaining the decryption keys is/are correct.

At that point, the user device can perform processing, perhaps based on user input to click a link or enter an OTP in an interface. Example such processing includes loading URL or communicating the OTP to an application server or other remote entity to authenticate the user.

Although various examples are provided, variations are possible without departing from a spirit of the claimed aspects.

Figure 6:
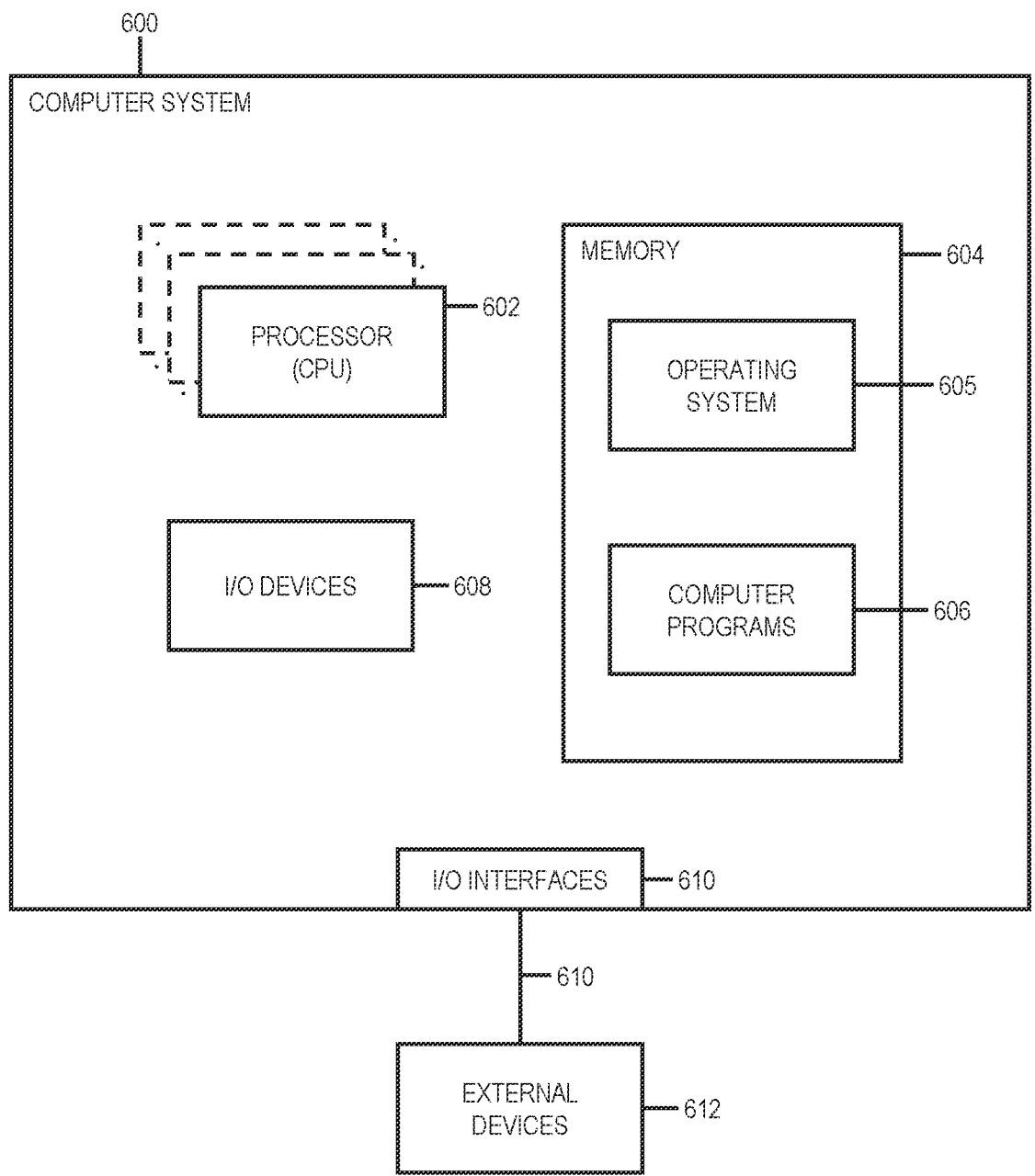
FIG. 6 depicts one example of a computer system and associated devices to incorporate and/or use aspects described herein.

Processes described herein may be performed singly or collectively by one or more computer systems, which may be, or be incorporated into, user/subscriber cellular devices, one or more devices of a telecommunications service provider network, one or more cloud servers, and/or one or more other computer systems, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
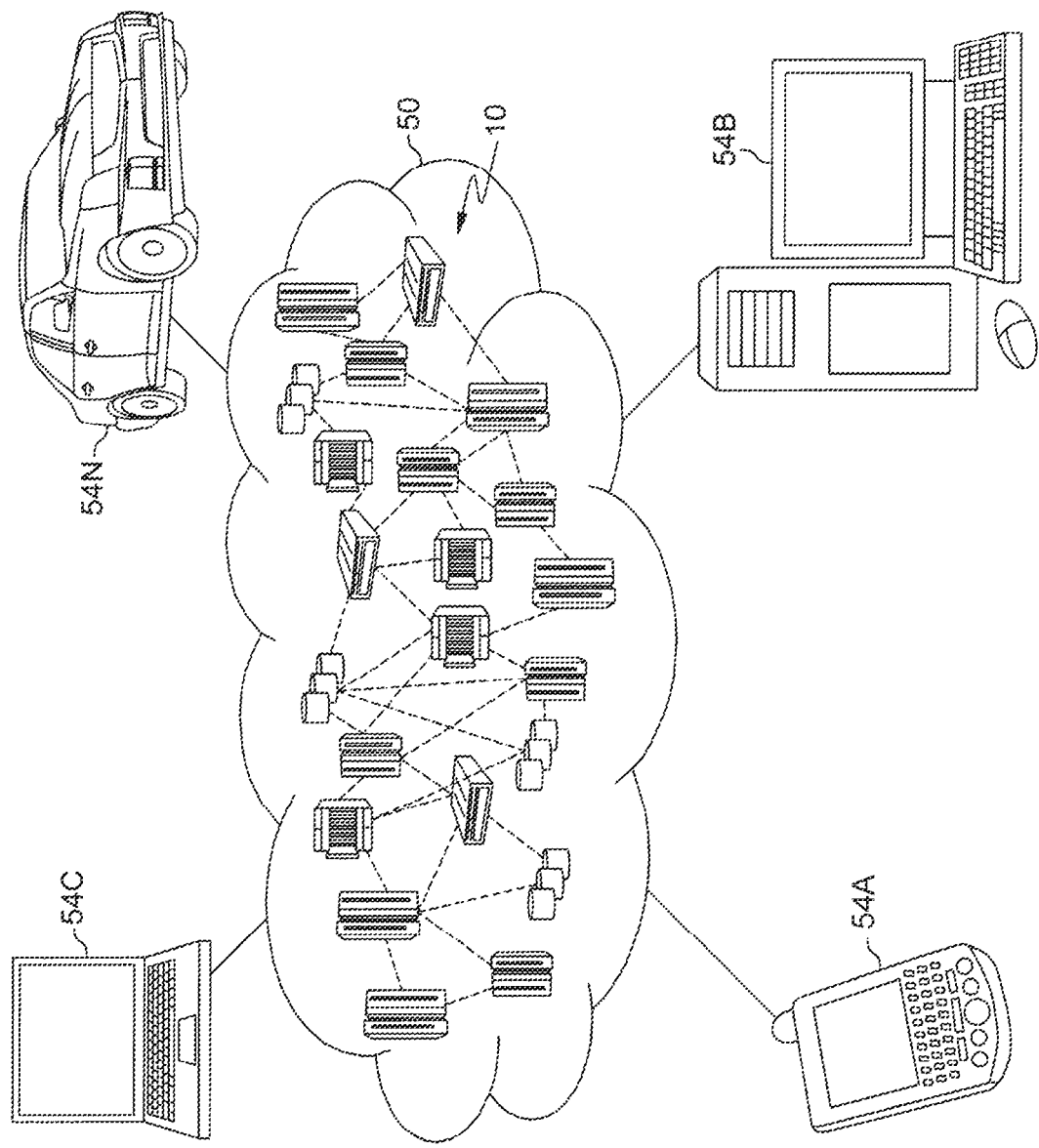
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
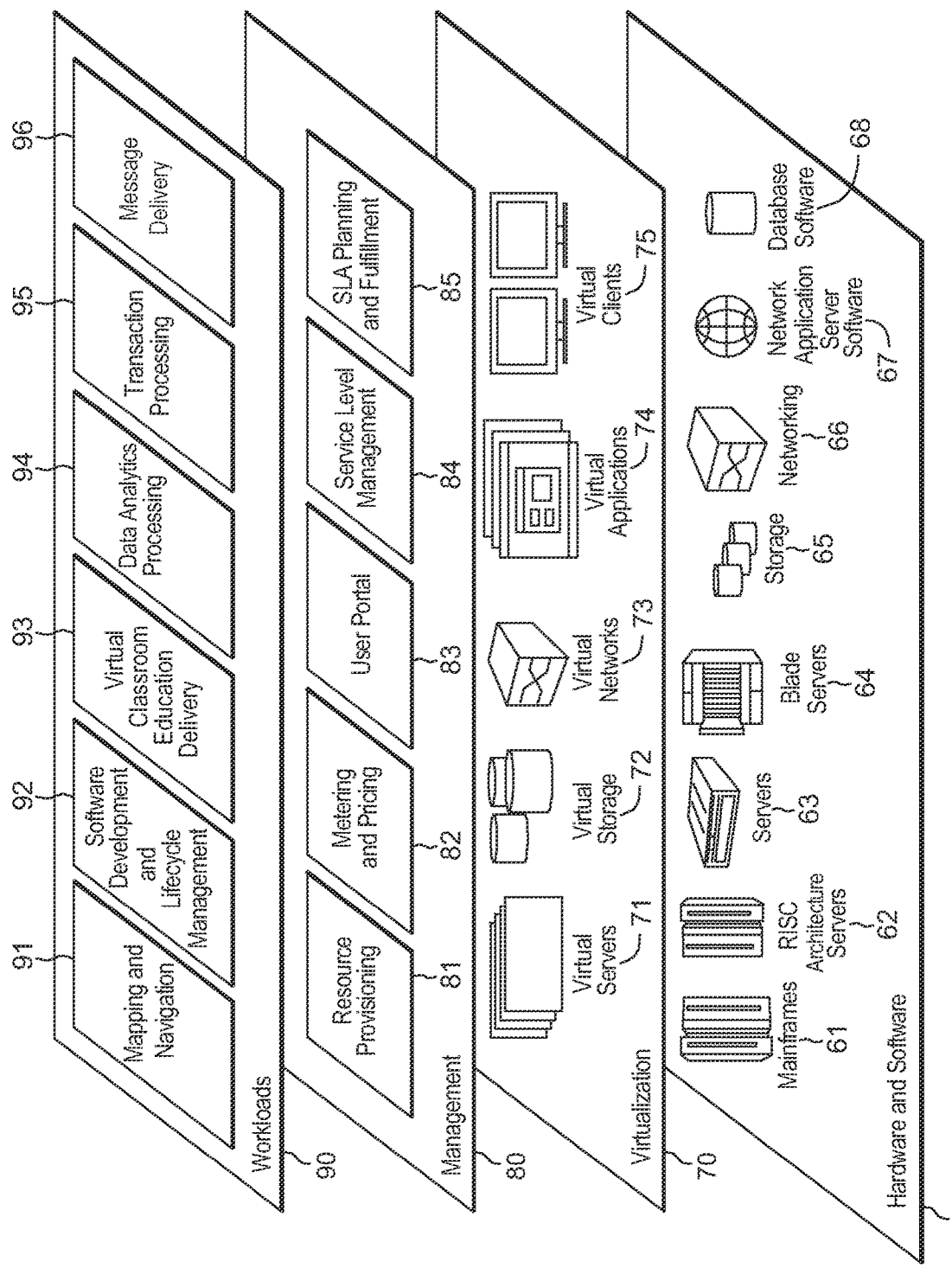
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message delivery in cellular roaming scenarios 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
based on initiating, by a user of a user device that is located in a remote location and that is activated with a remote telecommunications service provider (TSP) providing roaming cellular service to the user device in the remote location on a cellular network of the remote TSP, a transaction with a remote application server that is different from the user device, the transaction requiring user authentication based on delivery of a transactional text message to the user device via a cellular network connection, receiving from the remote application server the transactional text message for provision to the user device, wherein the user device is additionally activated with a home TSP that provides cellular service to the user device in a home location on a cellular network of the home TSP with a home cellular number provided by the home TSP, wherein the transactional text message is received from the remote application server by the home TSP and is to be sent by the home TSP to the user device via the remote TSP;
encrypting, by the home TSP, the transactional text message received from the remote application server to produce an encrypted transactional text message; and
forwarding the encrypted transactional text message by the home TSP to the user device in a short message service (SMS) text via the remote TSP for delivery to the user device in the remote location via the cellular network of the remote TSP.

2. The method of claim 1, further comprising using one or more shared secrets shared between the home TSP and the user to obtain at least one encryption key, wherein the encrypting the transactional text message uses the at least one encryption key to encrypt the transactional text message.

3. The method of claim 2, further comprising triggering expiration of the one or more shared secrets, wherein, based on the expiration, the home TSP disables use of the one or more shared secrets in encrypting subsequent messages to be forwarded to the user device.

4. The method of claim 3, wherein the expiration is triggered by at least one selected from the group consisting of: (i) a time-based trigger that expires the one or more shared secrets based on passage of a defined amount of time, (ii) a location-based trigger that expires the one or more shared secrets based on moving the user device out of a geographic boundary, and (iii) a push-based trigger that expires the one or more shared secrets based on receipt of an expiration indication from a trusted source.

5. The method of claim 1, wherein the user device is assigned a roaming cellular number by the remote TSP and the encrypted transactional text message is forwarded by the home TSP to the remote TSP for delivery to the user device via the roaming cellular number assigned by the remote TSP.

6. The method of claim 5 further comprising pre-establishing, prior to initiation of the transaction, a communications path for transactional message communication between the home TSP and the remote TSP, in which the home TSP sends a test message to the remote TSP for delivery to the user device via the roaming cellular number.

7. The method of claim 5, further comprising registering the roaming cellular number with the home TSP as an active secondary number to establish a link between the home cellular number and the roaming cellular number, wherein the registering is based on the user authenticating with the home TSP and securely registering the roaming cellular number therewith, and wherein the forwarding comprises sending the encrypted transactional text message to the roaming cellular number.

8. The method of claim 7, further comprising triggering expiration of the registration of the roaming cellular number as the active secondary number, wherein, based on the expiration, the roaming cellular number is disabled from use in forwarding messages to the user device, and wherein the expiration is triggered by at least one selected from the group consisting of, (i) a time-based trigger that expires the registration based on passage of a defined amount of time, (ii) a location-based trigger that expires the registration based on the user device moving out of a geographic boundary, and (iii) a push-based trigger that expires the registration based on receipt of an expiration indication from a trusted source.

9. The method of claim 5, further comprising:
generating a first shared secret and providing the first shared secret to the user;

receiving from the user a second shared secret;
using the first shared secret to obtain a first one or more encryption keys; and
using the second shared secret to obtain a second one or more encryption keys, wherein the encrypting the transactional text message uses the first one or more encryption keys and the second one or more encryption keys for layered encryption of the transactional text message to produce the encrypted transactional text message for forwarding.

10. The method of claim 1, wherein the home cellular number is registered with the remote TSP for international roaming in which the remote TSP uses the home cellular number in communicating messages to the user device in the remote location, and wherein the method further comprises:
generating a shared secret and providing the shared secret to the user; and
using the shared secret to obtain at least one encryption key, wherein the encrypting the transactional text message uses the at least one encryption key to encrypt the transactional text message.

11. The method of claim 1, wherein the transactional text message comprises a time-sensitive one-time-password for the user to provide to the remote application server for multi-factor authentication of the user for performance of the transaction.

12. A computer system comprising:
a memory; and
a processor in communication with the memory, wherein the computer system is configured to perform a method comprising:
based on initiating, by a user of a user device that is located in a remote location and that is activated with a remote telecommunications service provider (TSP) providing roaming cellular service to the user device in the remote location on a cellular network of the remote TSP, a transaction with a remote application server that is different from the user device, the transaction requiring user authentication based on delivery of a transactional text message to the user device via a cellular network connection, receiving from the remote application server the transactional text message for provision to the user device, wherein the user device is additionally activated with a home TSP that provides cellular service to the user device in a home location on a cellular network of the home TSP with a home cellular number provided by the home TSP, wherein the transactional text message is received from the remote application server by the home TSP and is to be sent by the home TSP to the user device via the remote TSP;
encrypting, by the home TSP, the transactional text message received from the remote application server to produce an encrypted transactional text message; and
forwarding the encrypted transactional text message by the home TSP to user device in a short message service (SMS) text via the remote TSP for delivery to the user device in the remote location via the cellular network of the remote TSP.

13. The computer system of claim 12, wherein the method further comprises:
using one or more shared secrets shared between the home TSP and the user to obtain at least one encryption key, wherein the encrypting the transactional text message uses the at least one encryption key to encrypt the transactional text message; and
triggering expiration of the one or more shared secrets, wherein, based on the expiration, the home TSP disables use of the one or more shared secrets in encrypting subsequent messages to be forwarded to the user device.

14. The computer system of claim 12, wherein the user device is assigned a roaming cellular number by the remote TSP and the encrypted transactional text message is forwarded by the home TSP to the remote TSP for delivery to the user device via the roaming cellular number assigned by the remote TSP, and wherein the method further comprises registering the roaming cellular number with the home TSP as an active secondary number to establish a link between the home cellular number and the roaming cellular number, wherein the registering is based on the user authenticating with the home TSP and securely registering the roaming cellular number therewith, and wherein the forwarding comprises sending the encrypted transactional text message to the roaming cellular number.

15. The computer system of claim 12, wherein the home cellular number is registered with the remote TSP for international roaming in which the remote TSP uses the home cellular number in communicating messages to the user device in the remote location, and wherein the method further comprises:
generating a shared secret and providing the shared secret to the user; and
using the shared secret to obtain at least one encryption key, wherein the encrypting the transactional text message uses the at least one encryption key to encrypt the transactional text message.

16. A computer program product comprising:
a computer readable storage medium readable by a processing circuit and storing instructions for execution by the processing circuit for performing a method comprising:
based on initiating, by a user of a user device that is located in a remote location and that is activated with a remote telecommunications service provider (TSP) providing roaming cellular service to the user device in the remote location on a cellular network of the remote TSP, a transaction with a remote application server that is different from the user device, the transaction requiring user authentication based on delivery of a transactional text message to the user device via a cellular network connection, receiving from the remote application server the transactional text message for provision to the user device, wherein the user device is additionally activated with a home TSP that provides cellular service to the user device in a home location on a cellular network of the home TSP with a home cellular number provided by the home TSP, wherein the transactional text message is received from the remote application server by the home TSP and is to be sent by the home TSP to the user device via the remote TSP;
encrypting, by the home TSP, the transactional text message received from the remote application server to produce an encrypted transactional text message; and
forwarding the encrypted transactional text message by the home TSP to the user device in a short message service (SMS) text via the remote TSP for delivery to the user device in the remote location via the cellular network of the remote TSP.

17. The computer program product of claim 16, wherein the method further comprises:

using one or more shared secrets shared between the home TSP and the user to obtain at least one encryption key, wherein the encrypting the transactional text message uses the at least one encryption key to encrypt the transactional text message; and triggering expiration of the one or more shared secrets, wherein, based on the expiration, the home TSP disables use of the one or more shared secrets in encrypting subsequent messages to be forwarded to the user device.

18. The computer program product of claim 16, wherein the user device is assigned a roaming cellular number by the remote TSP and the encrypted transactional text message is forwarded by the home TSP to the remote TSP for delivery to the user device via the roaming cellular number assigned by the remote TSP, and wherein the method further comprises registering the roaming cellular number with the home TSP as an active secondary number to establish a link between the home cellular number and the roaming cellular number, wherein the registering is based on the user authenticating with the home TSP and securely registering the roaming cellular number therewith, and wherein the forwarding comprises sending the encrypted transactional text message to the roaming cellular number.

19. The computer program product of claim 16, wherein the home cellular number is registered with the remote TSP for international roaming in which the remote TSP uses the home cellular number in communicating messages to the user device in the remote location, and wherein the method further comprises:

generating a shared secret and providing the shared secret to the user; and using the shared secret to obtain at least one encryption key, wherein the encrypting the transactional text message uses the at least one encryption key to encrypt the transactional text message.

20. The method of claim 1, wherein the remote TSP provides the roaming cellular service to the user device at a time of the initiating.

\* \* \* \* \*